United States Patent
Wilson et al.

(10) Patent No.: US 7,266,191 B2
(45) Date of Patent: Sep. 4, 2007

(54) METHOD FOR HANDLING TELEPHONE CALLS DIRECTED TO TELEPHONE NUMBERS OF TERMINATED USERS THAT HAVE BEEN REASSIGNED TO NEW USERS

(75) Inventors: Jeffrey Kenneth Wilson, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/010,130

(22) Filed: Dec. 10, 2004

(65) Prior Publication Data

US 2006/0126810 A1 Jun. 15, 2006

(51) Int. Cl.
H04M 3/42 (2006.01)
(52) U.S. Cl. .............................. 379/213.01; 379/218.01
(58) Field of Classification Search ........... 379/201.01, 379/204.01, 211.01, 211.02, 212.01, 213.01, 379/218.01
See application file for complete search history.

(56) References Cited

U.S. PATENT DOCUMENTS

| | | | |
|---|---|---|---|
| 4,053,949 A | 10/1977 | Recca et al. | |
| 5,613,006 A | 3/1997 | Reese | |
| 5,991,368 A | 11/1999 | Quatse et al. | |
| 6,055,300 A | 4/2000 | Alton et al. | |
| 6,088,433 A | 7/2000 | Culli et al. | |
| 6,330,327 B1 | 12/2001 | Lee et al. | |
| 6,643,363 B1 | 11/2003 | Miura | |
| 6,718,028 B2 | 4/2004 | Culli et al. | |
| 6,748,058 B1 | 6/2004 | Schwend et al. | |
| 2004/0008834 A1* | 1/2004 | Bookstaff | 379/218.01 |

* cited by examiner

Primary Examiner—Creighton Smith
Assistant Examiner—Olisa Anwah
(74) Attorney, Agent, or Firm—Janice E. Clements

(57) ABSTRACT

A comprehensive method for handling telephone calls directed to a telephone number of a terminated user that has been reassigned to a new user. The present invention provides user with a notification service that intercepts telephone calls to said telephone number and notifies callers that the telephone number has been reassigned to the new user. Callers seeking the new user continue calls to user, which results in user only being alerted by continuing callers and not being bothered by callers seeking the terminated user. The user can customize the notification message to inform callers of the details regarding the telephone number reassignment and to whom the telephone number was reassigned. The user can specify a time period for the notification service to be activated. The notification service stores all continuing calls in a log, and bypasses all subsequent calls from telephone numbers listed in the log. The user can also store telephone numbers in the log to be bypassed, such as telephone numbers from the user's address book, once the notification service is activated so that these callers will never be intercepted by the notification service. The user can also delete telephone numbers from the bypass log.

20 Claims, 4 Drawing Sheets

METHOD FOR HANDLING TELEPHONE CALLS DIRECTED TO TELEPHONE NUMBERS OF TERMINATED USERS THAT HAVE BEEN REASSIGNED TO NEW USERS

TECHNICAL FIELD

The present invention relates to telecommunications through telephone systems and mobile wireless cellular telephone systems, and particularly to the use of such systems to intercept and handle telephone calls directed to expired telephone numbers that have been reassigned to new users.

BACKGROUND OF RELATED ART

With the globalization of business, industry and trade wherein transactions and activities within these fields have been changing from localized organizations to diverse transactions over the face of the world, the telecommunications industries have, accordingly, been expanding rapidly. Wireless telephones and particularly, cellular telephones have become so pervasive that their world wide number is in the order of hundreds of millions. While the embodiment to be subsequently described relates to telephone systems, including cellular telephones, the principles of the invention would be applicable to any wireless personal communication device that could be used to communicate in a cellular telecommunications system. These would include the wide variety of currently available communicating personal palm devices or Personal Digital Assistants (PDAs), which include, for example, Microsoft's WinCE line; the PalmPilot line produced by 3Com Corp.; and International Business Machines Corporation's WorkPad. These devices are comprehensively described in the text, *Palm III & PalmPilot*, Jeff Carlson, Peachpit Press, 1998.

The present invention provides a method of intercepting and handling a telephone call directed to an expired telephone number that has been reassigned to a new user without the new user having to handle the call. In many cases, an unlucky user is assigned a telephone number that previously belonged to a user who was delinquent in paying debts or frequently received other similar annoying telephone calls. The user who inherits such a telephone numbers also inherits the annoying telephone calls.

The present invention allows callers to become aware of telephone numbers that have expired and been reassigned to new users. This invention allows the callers to become more productive in seeking the persons they intend to call, and saves the time of the callers and the new users to whom the numbers were reassigned by reducing calls to wrong users.

SUMMARY OF THE PRESENT INVENTION

The present invention provides a telecommunication service provider system for handling telephone calls directed to a telephone number of a terminated user that has been reassigned to a new user. The new user of the telephone number can activate a notification service of the present invention which will receive calls directed to the new user's telephone number. The notification service provides a message responsive to received calls informing callers that the telephone number they have called has been reassigned to a new user. A caller will have an option of continuing a call to the telephone number to reach the new user or discontinuing the call if the caller intended to call the terminated user. The notification service stores telephone numbers of received continuing calls in a log and permits all subsequent received calls from telephone numbers listed on the log to bypass the notification message and go directly to the new user.

The present invention is particularly useful in situations where a telephone number of a terminated user is frequently called by callers seeking the terminated user and said calls are received by a new user to whom the telephone number has been reassigned. The new user has unknowingly inherited the terminated user's problems with frequent receipt of annoying calls, and in some cases, callers, such as creditors or even stalkers of the terminated user, may not believe the telephone number was reassigned and will continue to call and harass the new user. The notification service message gives callers information entered by the new user, such as the date the telephone number was reassigned, to whom the number was reassigned, the company where the new user works if the telephone is a work number, the city of the new user, and the state of the new user. The new user specifies a time period for the notification service to be activated. The present invention assists the new user by intercepting annoying calls directed to a terminated user's telephone number, and informs callers about the reassignment of the telephone number so that optimally, the new user receives only calls intended for the new user.

While the notification service process may take callers a few seconds longer to reach the new user the first time they call the new user's telephone number, their telephone numbers are stored in the notification service's log and all future calls from these callers will bypass the notification service message and go directly to the new user. The user can also enter telephone numbers, such as those in the new user's address book, into the log to be bypassed by the notification service once the notification service is activated so that these telephone numbers are never intercepted by the notification service. Alternatively, the user can delete telephone numbers from the bypass log so callers associated with said telephone numbers will be handled by the notification service.

For simplicity in illustration, the following description will use conventional telephone calling. However, it will be understood that currently and into the future, a greater and greater proportion of telecommunication networks will be used in providing Web services and other data intensive transactions. The present invention is intended to cover telecommunications, i.e. calling over these networks for the distribution of all types of data normally transmitted over such networks. Thus, when the current specification and claims refer to telephone calling, it is intended that such calling cover the messaging between computers for Web services and all other means of data transactions.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
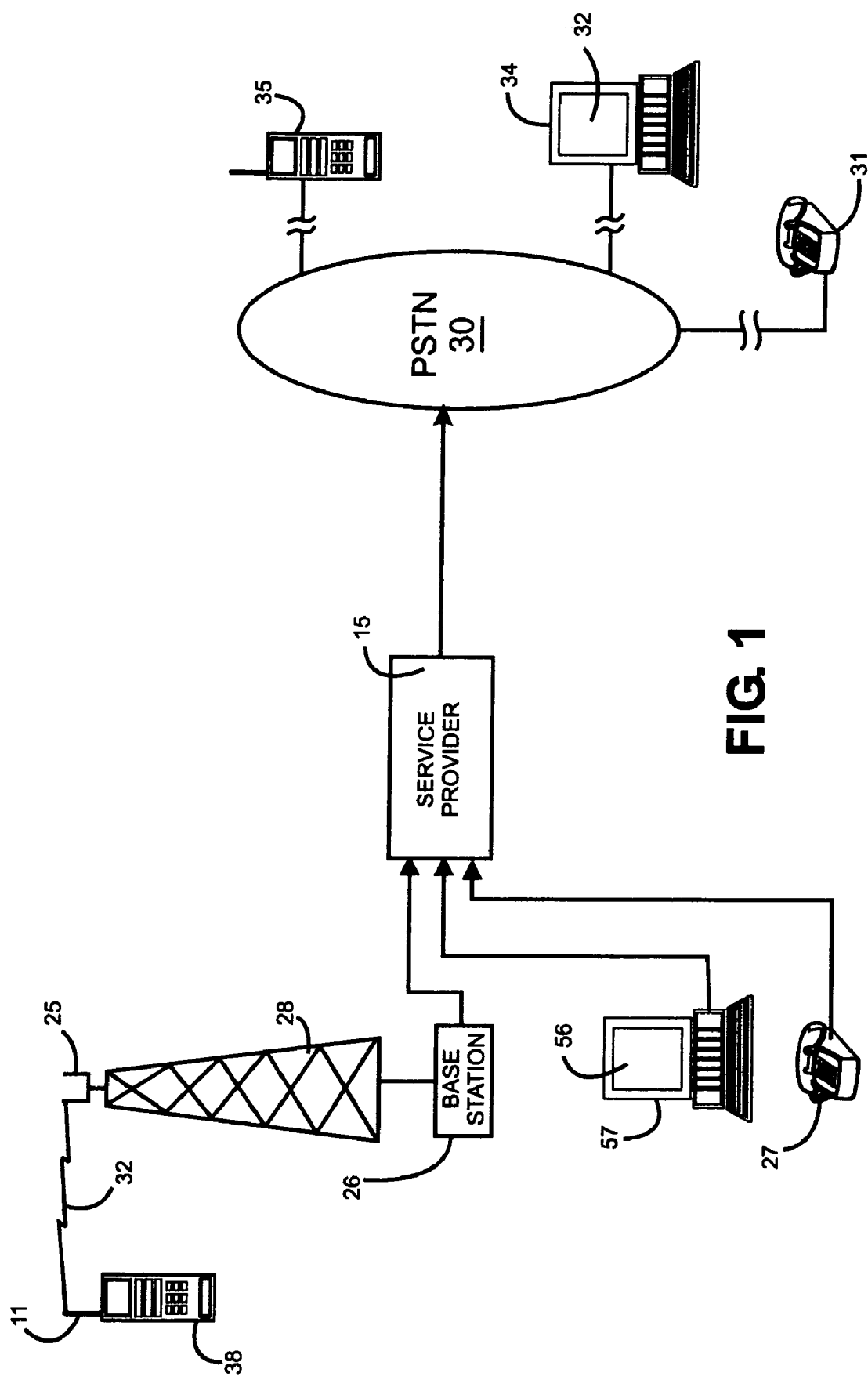
FIG. 1 is a generalized diagrammatic view of a portion of a Public Switched Transmission Network showing channel paths to and from both conventional and mobile wireless channels via a plurality of service providers on which the present invention may be implemented.

With reference to FIG. 1, there will be described a method for handling telephone calls directed to telephone numbers of terminated users that have been reassigned to new users. To illustrate the calling station, two telephones are shown: wired telephone 27 and mobile wireless telephone 38. The conventional telephone 27 is connected to the PSTN 30 via a service provider 15 in a fully wired telecommunications system. Also shown is a computer 57 with user interactive input via display 56, which a caller may use to call the new user's telephone number. The program of the present invention for handling telephone calls directed to telephone numbers of terminated users that have been reassigned to new users is carried out on a computer 34 with user interactive input via display 32, wired telephone 31, mobile wireless telephone 35, or any other communications device. The mobile cellular telephone 38 and the computer 34 are connected into the PSTN 30 via a service provider 15. There is a cellular telephone communication path 32 from the respective cellular phone antenna 11 to antenna 25 on cell tower 28. The distribution or routing of the telephone call to the PSTN 30 via base station 26 and service provider 15, and ultimately to a user's receiving telecommunication station, e.g. conventional telephone 31, computer 34 with interactive display 32, or mobile wireless telephone 35.

As will be hereinafter described in greater detail with respect to FIGS. 3 and 4, the programs of the present invention are implemented on a display computer that handles telephone calls initiated from a telephone 27, mobile wireless telephone 38, or computer 57, which are directed to telephone numbers of terminated users that have been reassigned to a new user at a conventional telephone 31, mobile wireless telephone 35, or computer 34 via a service provider 15. A user can activate the telecommunication service provider system's notification service, and enter information into said notification service via a conventional telephone 31, mobile wireless telephone 35, computer 34, or other communications device regarding the reassignment of the telephone number, and any of the user's personal information, such as the user's name, address, and company for which the user works, that the user wants relayed to callers by the notification service's outgoing message. The user can also specify a time period that the notification service will be activated and handling the user's telephone calls. The user can enter telephone numbers into the notification service's bypass log that will be bypassed when called by callers associated with said telephone numbers. The user can also delete telephone numbers from the notification service bypass log. In this connection it is to be noted that cellular phones and related wireless devices are intended to include smartphones and Internet screen phones, as well as wireless personal digital assistants that would have enough computer capacity to handle the programs needed to implement the present invention.

Since the implementation of the present invention involves wireless cellular telephones, it would be appropriate to consider some background with respect to wired and wireless telephones. The standard wired telecommunications system that has been in use world wide for well over 100 years, is the conventional handheld or speaker input wired into a base, that, in turn, is wired into a PSTN with wired switched channel paths to and from other telephones or like devices through their bases. These telephones are respectively connected to the PSTN via local switching centers or switching nodes in a fully wired telecommunication system. Conventionally, these switching centers have many telephones connected to each. The centers operate to control the channel connections, i.e. switch into and out of the PSTN, those calls originated or terminated at telephone stations.

In addition, there have been developed over the past 20 years, the mobile wireless long range RF "wireless" telephone systems that have been commercialized primarily as the "cellular" telephone system. Before the cellular wireless phone system was developed, long range mobile wireless phones were relatively rudimentary; they were usually in automobiles. There was usually one central tower with about 25 channels available on the tower. The mobile wireless telephone needed a large powerful transmitter, usually in the automobile, that had to transmit up to 50 miles and was too cumbersome for any personal or portable phone.

In the cellular system for the handheld mobile wireless phone, an area such as a city is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city, there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824-894 MHz ranges.

Figure 2:
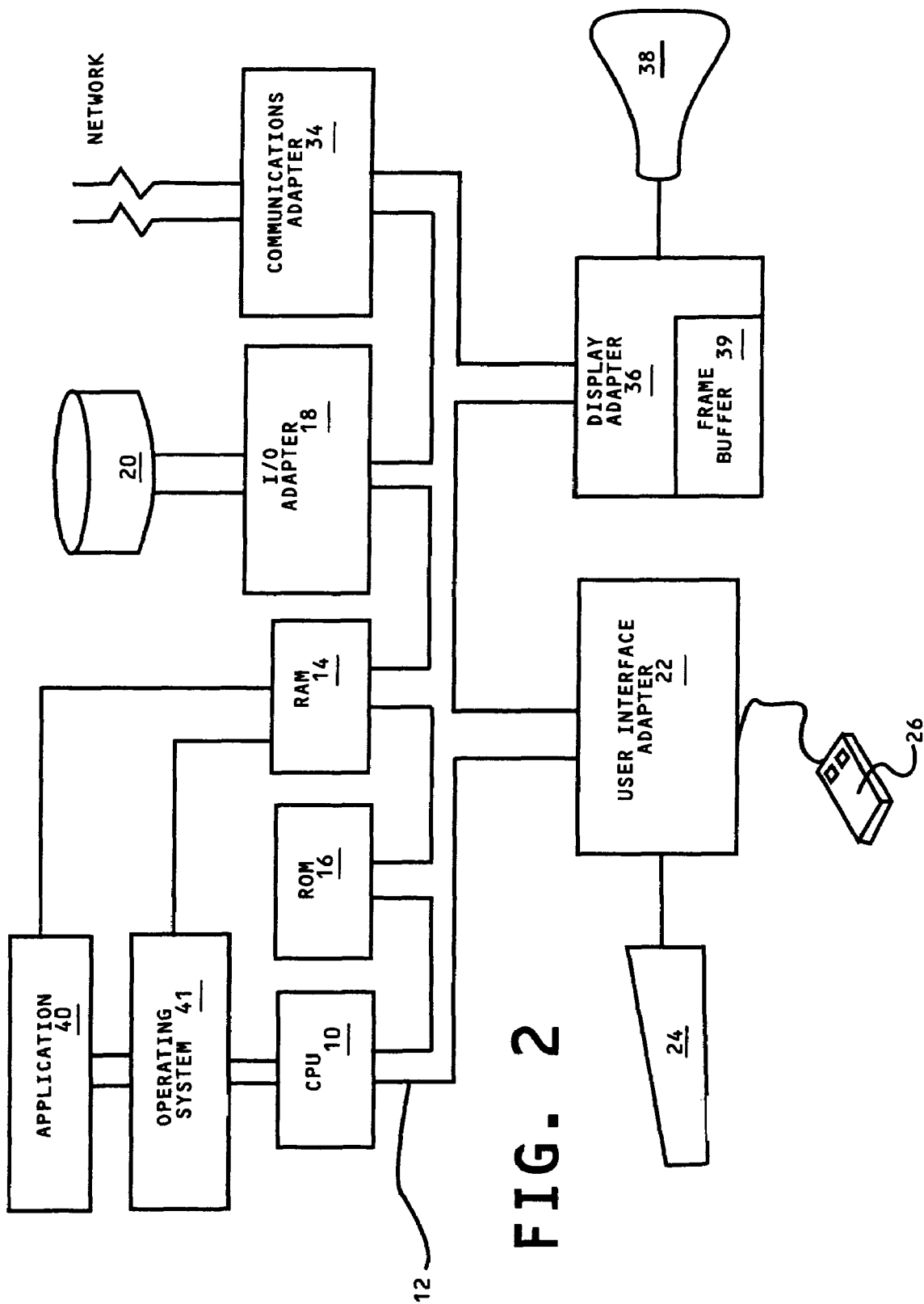
FIG. 2 is a block diagram of a generalized display computer system including a processor unit that provides for user entry of data for the practice of the present invention.

Referring to FIG. 2, a typical data processing system is shown that may function as the telecommunication service provider system that handles telephone calls directed to telephone numbers of terminated users that have been reassigned to new users. A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XP™ or Windows2000™, as well as UNIX and IBM AIX operating systems.

Application programs 40, controlled by the system, are moved into and out of the main memory Random Access Memory (RAM) 14. These programs include the programs of the present invention for intercepting telephone calls from telephone numbers not listed on a bypass log and informing callers from said telephone numbers about the reassignment of the telephone number they have called. The user will less likely be bothered by telephone calls intended for the previous user assigned the number who subsequently terminated his service with the service provider. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20.

Communications adapter 34 interconnects bus 12 with the outside network enabling the computer system to communicate with other such computers over networks. I/O devices are also connected to system bus 12 via user interface adapter 22 and display adapter 36. Keyboard 24 and mouse 26 are all interconnected to bus 12 through user interface adapter 22. It is through such input devices that the user may interactively enter user entry data used by the service provider's notification service of the present invention for handling the user's telephone calls during a time specified by the user via said input devices. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
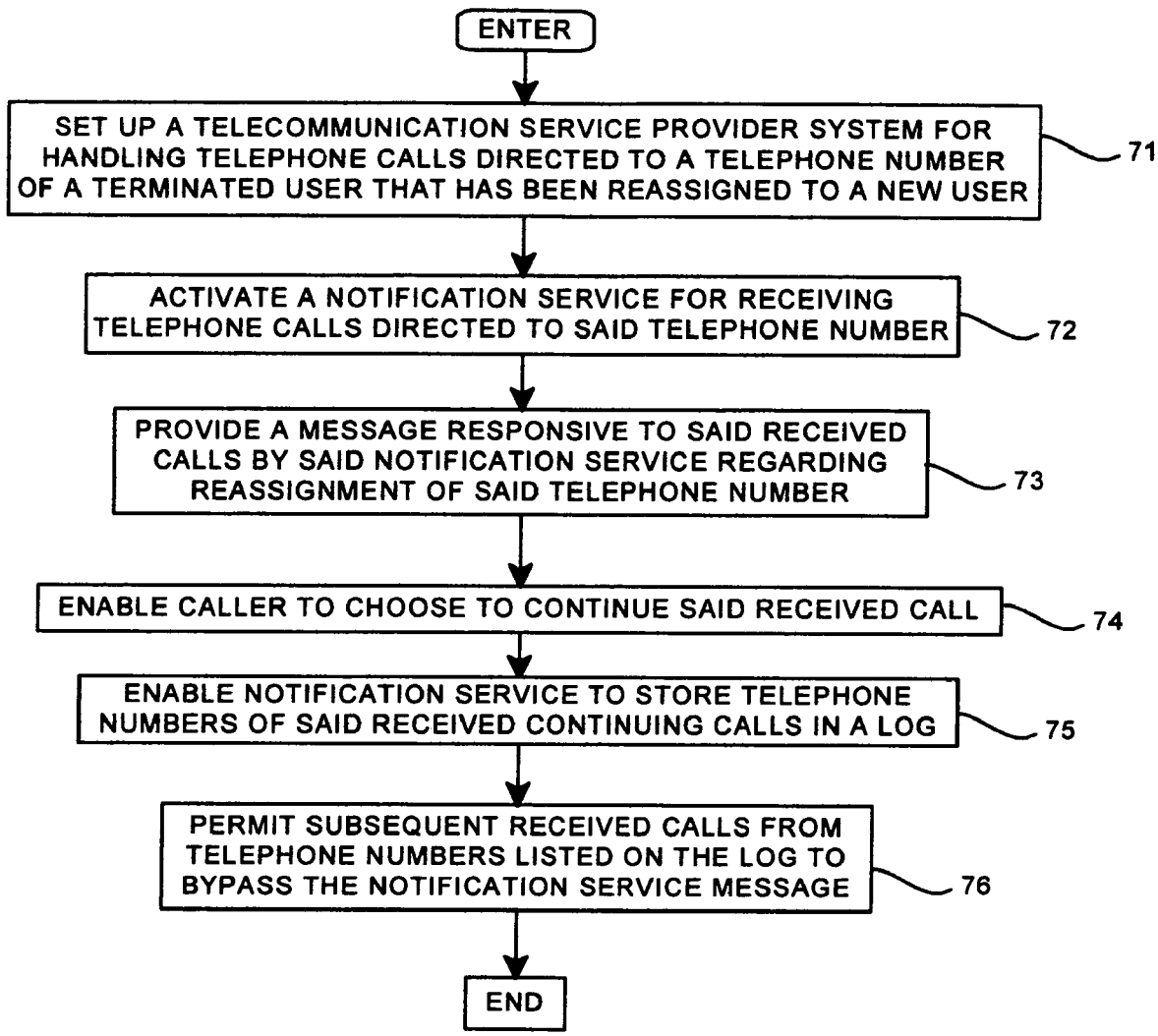
FIG. 3 is a flowchart describing how the telecommunication service provider system of the present invention is set up to handle telephone calls.
Figure 4:
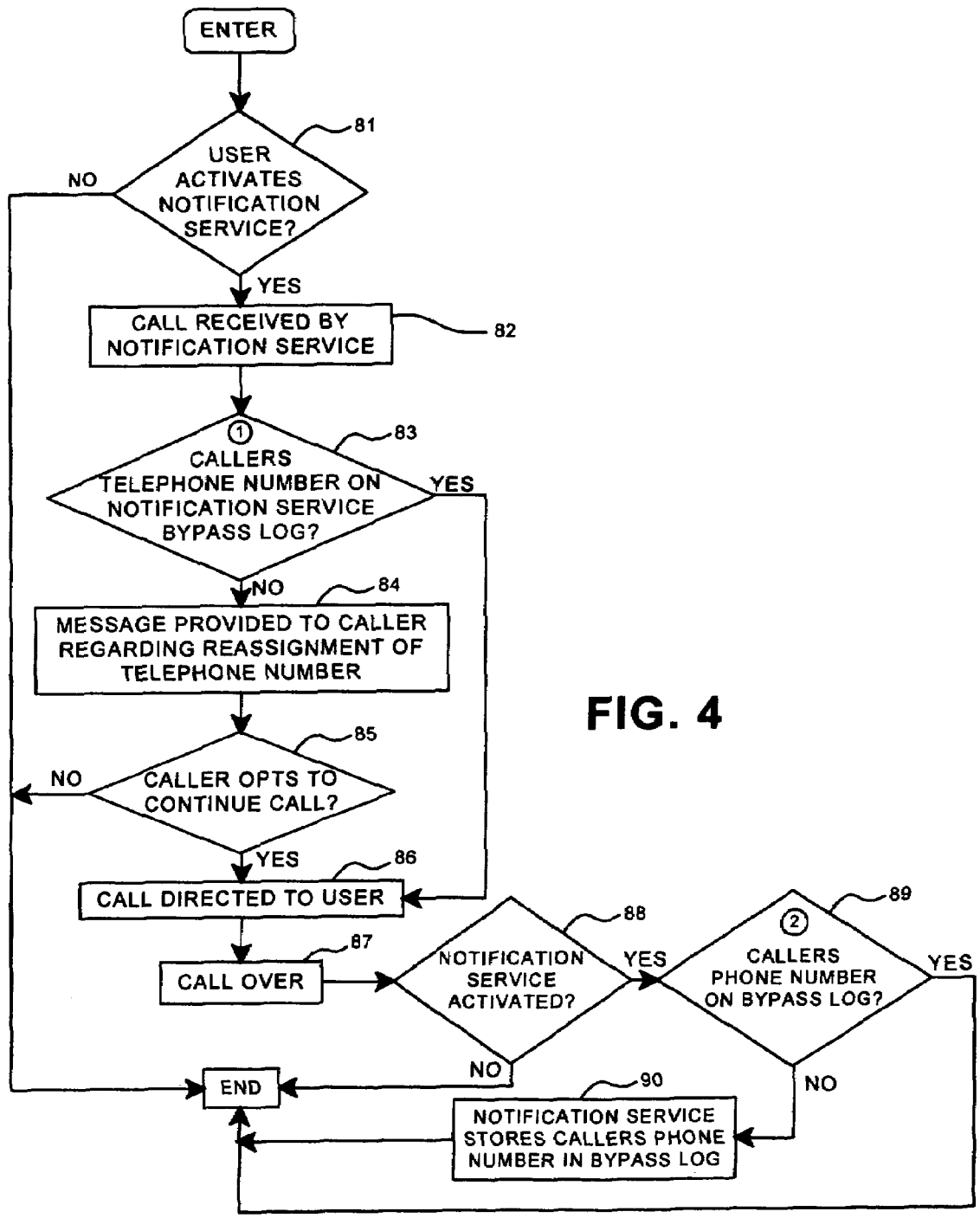
FIG. 4 is a flowchart of an illustrative simplified run of the telephone call handling program set up according to FIG. 3.

FIG. 3 is a flowchart showing the development of a process according to the present invention for minimizing the number of telephone calls to a user's telephone number from callers attempting to reach the previous assignee of the user's telephone number. The program is operative in an environment wherein a user has been assigned a telephone number that previously was assigned to a different user whose service was subsequently terminated with the service provider prior to the assignment of said telephone number to the new user. The invention is most appreciated by a user who is assigned a telephone number that previously was assigned to a terminated user who received frequent harassing telephone calls from numerous callers. In the present invention, a telecommunication service provider system is set up for handling telephone calls directed to telephone numbers of terminated users that have been reassigned to new users, step 71. The user activates a notification service within said system that receives the user's telephone calls directed to said telephone number, step 72. The notification service provides a message responsive to said received calls regarding the reassignment of said telephone number, step 73. The notification service enables the caller to choose to continue said received call, step 74. The notification service is enabled to store telephone numbers of received continuing calls in a log, step 75, which results in subsequent received calls from telephone numbers listed in the log to bypass the notification service message, step 76. The user can enter telephone numbers, such as from the user's address book, into said bypass log so that calls from entered telephone numbers are sent directly to user and are never handled by the notification service. Also, a user can delete telephone numbers from the bypass log, which is especially useful in cases where a harassing caller to the terminated user continues his calls to the new user, and persists in calling the new user's telephone number.

A simplified run of the process set up in FIG. 3 will now be described with respect to the flowchart of FIG. 4. A user of a recently reassigned telephone number determines whether to activate a notification service of the telecommunication service provider system, step 81. If No, all calls are sent directly to user, step 86, and when the call is over, step 87, the process ends. If Yes, the call is sent to the notification service, step 82. The present invention includes a feature wherein the notification system bypasses any telephone numbers listed in a log of telephone numbers that are approved by the user to be sent directly to the user. The user may enter telephone numbers into the bypass log, delete telephone numbers in the bypass log. Also, the notification system is enabled to add telephone numbers of received continuing calls to the bypass log. A first determination is made by the notification service regarding whether the caller's telephone number is on the bypass log, step 83. If Yes, the call is directed to user, step 86. When the call is over, 87, a determination is made regarding whether the notification service was activated, step 88. If Yes, a second determination is made regarding whether the caller's telephone number is in the bypass log, step 89. If Yes, the process ends when the call is over. If No, the notification service stores the caller's telephone number in the bypass log, step 90 and the process ends.

Regarding the first determination of whether the caller's telephone number is listed in the bypass log, step 83, if No, the notification service provides a message to the caller regarding the reassignment of the telephone number, step 84. The caller is given prompts by the notification service and the caller chooses whether to continue the call, step 85. If No, the process ends. If Yes, the call is directed to the user, step 86. When the call is over, step 87, a determination is made regarding whether the notification service was activated, step 88. If Yes, a second determination is made regarding whether the caller's telephone number is in the bypass log, step 89. If Yes, the process ends. If No, the notification service stores the telephone number of the received continuing call in the bypass log, step 90, so that all subsequent calls received by said continuing caller will bypass the notification message and go directly to user, and the process ends. There is also a feature where the user can remove telephone numbers from the bypass log.

Although certain preferred embodiments have been shown and described, it will be understood that many changes and modifications may be made therein without departing from the scope and intent of the appended claims.

We claim:

1. A telecommunication service provider system for handling telephone calls directed to a telephone number of a terminated user that has been reassigned to a new user, comprising:

means for activating a notification service;

means in said notification service for receiving telephone calls directed to said telephone number;

means in said notification service for providing a message responsive to received calls directed to said telephone number regarding the reassignment of the telephone number;

means enabling a caller to choose whether to continue said received call;

means in the notification service to store telephone numbers of said received continuing calls in a log; and means permitting subsequent received calls from telephone numbers listed on the log to bypass the notification message.

2. The communication service provider system of claim 1 wherein the user specifies a time period for the notification service to be activated.

3. The communication service provider system of claim 2 wherein the message from the notification service specifies the date the telephone number was reassigned.

4. The communication service provider system of claim 3 wherein the telephone number is reassigned to a wireless cellular telephone.

5. The communication service provider system of claim 3 wherein the telephone number is reassigned to a laptop computer.

6. The communication service provider system of claim 3 wherein a user can enter telephone numbers to the log to bypass the notification service message.

7. The communication service provider system of claim 3 wherein a user can delete telephone numbers on said bypass log.

8. In a telecommunication network, a method for handling telephone calls directed to a telephone number of a terminated user that has been reassigned to a new user, comprising:
   activating a notification service;
   receiving means in said notification service directing calls to said telephone number;
   messaging means in said notification service for providing a message responsive to received calls directed to said telephone number regarding the reassignment of the telephone number;
   determining means enabling a caller to choose whether to continue said received call;
   storing means in the notification Service to store continuing calls in a log; and
   permitting subsequent received calls from telephone numbers listed in the log to bypass the notification message.

9. The method for handling telephone calls of claim 8 further comprising specifying a time period by the user for the notification service to be activated.

10. The method for handling telephone calls of claim 9 wherein the message from the notification service specifies the date the telephone number was reassigned.

11. The method for handling telephone calls of claim 10 wherein the telephone number is reassigned to a wireless cellular telephone.

12. The method for handling telephone calls of claim 10 wherein the telephone number is reassigned to a laptop computer.

13. The method for handling telephone calls of claim 10 wherein a user can enter telephone numbers to the log to bypass the notification service message.

14. The method for handling telephone calls of claim 10 wherein a user can delete telephone numbers from said bypass log.

15. A computer readable medium storing a computer program which when executed performs the implementation for handling telephone calls directed to a telephone number of a terminated user that has been reassigned to a new user, comprising:
   means for activating a notification service;
   means in said notification service for receiving telephone calls directed to said telephone number;
   means in said notification service for providing a message responsive to received calls directed to said telephone number regarding the reassignment of the telephone number;
   means enabling a caller to choose whether to continue said received call;
   means in the notification service to store telephone numbers of said received continuing calls in a log; and
   means permitting subsequent received calls from telephone numbers listed on the log to bypass the notification message.

16. The computer readable medium for handling telephone calls of claim 15 wherein the user specifies a time period for the notification service to be activated.

17. The computer readable medium for handling telephone calls of claim 16 wherein the message from the notification service specifies the date the telephone number was reassigned.

18. The computer readable medium for handling telephone calls of claim 17 wherein the telephone num her is reassigned to a wireless cellular telephone.

19. The computer readable medium for handling telephone calls of claim 17 wherein a user can enter telephone numbers to the log to bypass the notification service message.

20. The computer readable medium for handling telephone calls of claim 19 wherein a user can delete telephone numbers from said bypass log.

* * * * *